R. HARTLEY & J. B. MARSHALL.
Plunger-Pump.

No. 168,640.

Patented Oct. 11, 1875.

Witnesses,
Chas H Smith
Harold Serrell

Inventors
Roger Hartley
John B. Marshall
Lemuel W. Serrell
atty.

UNITED STATES PATENT OFFICE.

ROGER HARTLEY AND JOHN B. MARSHALL, OF PITTSBURG, PA., ASSIGNORS TO SARAH HARDICK, EXECUTRIX, AND JOHN RYER AND ABRAHAM H. VAN HOESEN, EXECUTORS, OF CHAS. B. HARDICK, DECEASED.

IMPROVEMENT IN PLUNGER-PUMPS.

Specification forming part of Letters Patent No. 168,640, dated October 11, 1875; application filed July 16, 1875.

*To all whom it may concern:*

Be it known that we, ROGER HARTLEY and JOHN B. MARSHALL, of Pittsburg, in the county of Allegheny and State of Pennsylvania, have invented an Improvement in Plunger-Pumps, of which the following is a specification:

Pumps have been made with a plunger sliding through a central packing within a cylinder, and the cylinder has been divided in two parts at this place, and bolted together so as to allow for the introduction of such packing; but the entire cylinder, water-ways, and valve-chest have had to be made with special reference to this division of the cylinder, involving considerable labor and changing the general character and direction of the water-ways.

Our invention is made with reference to introducing and adjusting a central packing in the cylinder of a plunger-pump without materially changing either the cylinder or the water-ways, thereby adapting the improvement in question to cylinders that can be introduced in place of those of ordinary construction.

Figure 1:
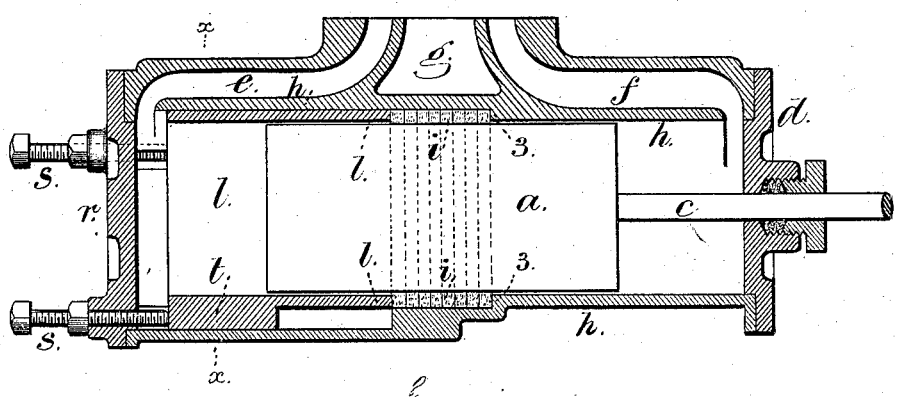
Figure 2:
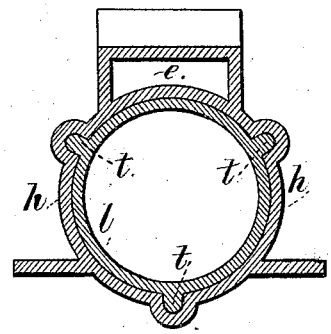

In the drawing, Figure 1 is a longitudinal section of the pump-cylinder, and Fig. 2 is a cross-section of the same at the line $x\ x$.

The plunger $a$, piston-rod $c$, cylinder-head $d$, water-ways $e\ f$, induction-port $g$, and cylinder $h$ are the same as have before been made use of, except that the cylinder $h$ is made of larger internal diameter at one end than the other, sufficiently so to allow for the introduction of the packing-rings $i$ around the plunger in the portion of the cylinder that is of largest diameter, such rings resting against the shoulder 3 on one side, and being set up by the cylindrical sleeve $l$ upon the other. The internal diameters of this cylinder $h$ and cylindrical sleeve $l$ are such that the plunger $a$, as it slides, does not touch; hence, the interior surfaces do not require to be turned or bored. The plunger, however, is finished upon its exterior surface, and the packing-rings $i$ set tightly upon it; and we remark that all these packing-rings may be elastic, or one or more may be of metal, so as to support the weight of the plunger; or there may be a rib cast upon the inside of the cylinder to form a support for the plunger.

In order to compress the elastic packings, and set them up from time to time, we make use of the screws $s$ that pass through the head $r$ and act upon the rear end of the sleeve $l$, and it is preferable to provide lugs $t$ upon the outer surface of the sleeve in line with the screws, so as to furnish the proper bearing-surfaces for such screws, and the cylinder has grooves cast in its interior surface for the reception of these lugs.

By removing the back-head $r$ of the cylinder the sleeve $l$ can be withdrawn and the packing-rings replaced without disturbing any other portion of the pump.

We claim as our invention—

1. The screws $c$ passing through the removable back head $r$, in combination with the sleeve $l$, packing-rings $i$, and cylinder $h$, as and for the purposes set forth.

2. The sleeve $l$ and lugs $t$, forming bearings in combination with the screws $s$ and cylinder $h$, having grooves for such lugs, substantially as specified.

Signed by us this 13th day of July, 1875.

ROGER HARTLEY.
   JOHN B. MARSHALL.

Witnesses:
 GEO. T. PINCKNEY,
 CHAS. H. SMITH.